3,243,814
MULTIPLE RADAR RANGE EXTENSION SYSTEM

William A. Massey, Shalimar, Fla., assignor to the United States of America as represented by the Secretary of the Air Force
Filed Mar. 30, 1964, Ser. No. 355,985
1 Claim. (Cl. 343—17.1)

This invention relates to radar type pulse transmitting and receiving systems, and more particularly to apparatus for extending the operating range of such systems.

One problem in radar or in any system that transmits a pulse of energy periodically to determine the range of a target by measuring the time between the transmission of the pulse and the reception of the reply or reflected energy, is that at certain ranges the reply returns at the instant a new pulse is being transmitted. This occurs when the range is such that the time required for the energy to reach the target and return is the same as, or an integral multiple of, the period at which pulses are transmitted.

Obviously, one solution to the problem of tracking at such a range is to shift the pulse repetition frequency enough so the return and a new transmitted pulse do not coincide. However, it is impractical to increase or decrease the pulse repetition frequency indefinitely because some shifts in the pulse repetition frequency may cause a momentary loss of track while the range machine is slewed in or out in range. Another disadvantage of shifting the pulse repetition frequency is that it complicates the problem for synchronizing or phasing radars to avoid mutual interference. The present invention offers a system of extending radar range without the above-mentioned disadvantages using a radar system that has range stops.

Therefore, an object of this invention is to provide in a radar system having no range stops, a novel method and means for receiving a radar signal without interference from a transmitted signal.

More specifically, an object of this invention is to provide for a system for receiving a radar signal in radars having range stops without interference from a transmitted signal which does not require the varying of the pulse repetition frequency.

Figure 1:
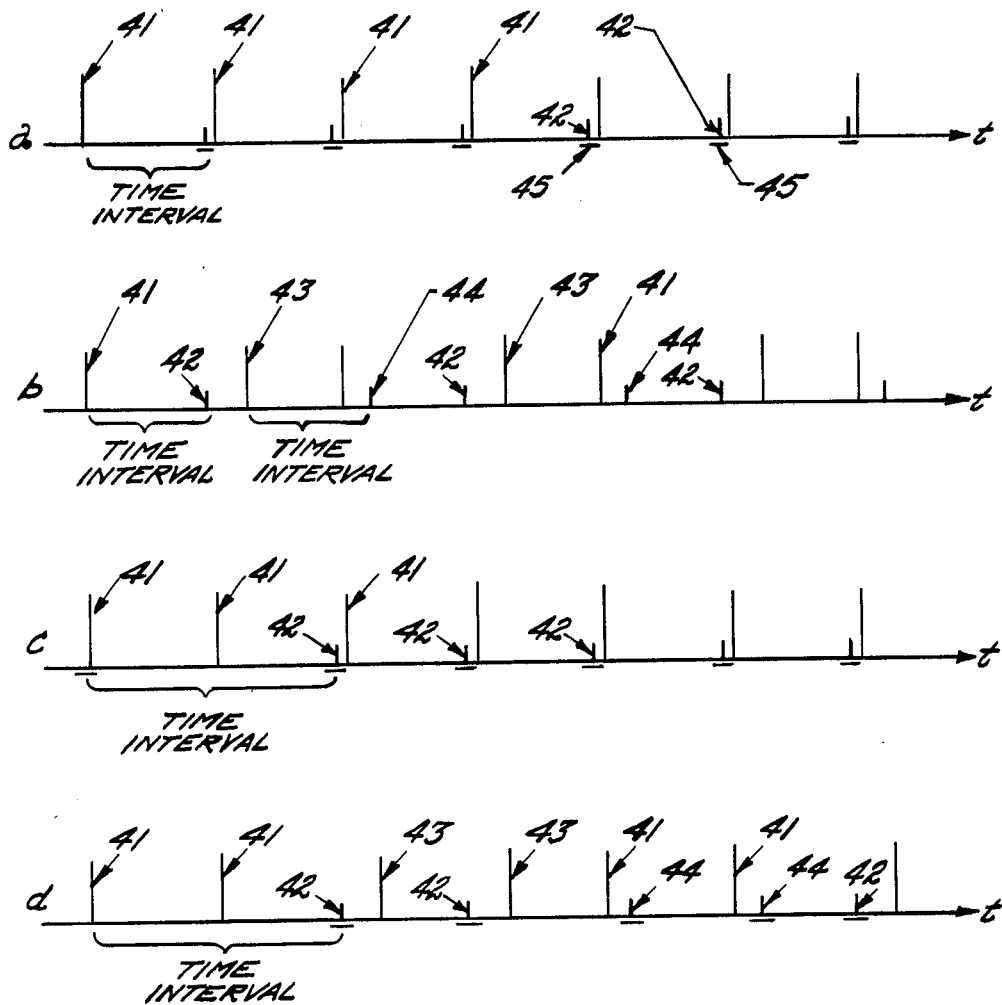
Figure 2:
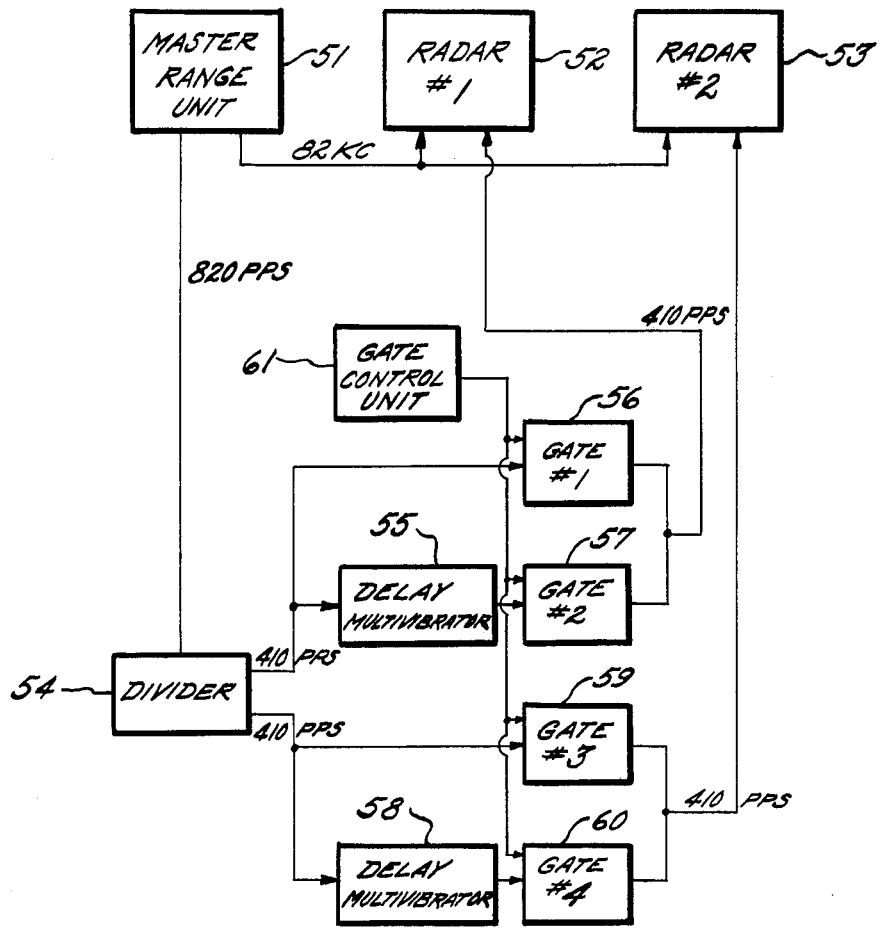

Other objects and features of this invention will become more apparent by reference to the following description when taken in conjunction with the accompanying drawings in which:

FIG. 1 shows a series of related pulse diagrams that are helpful to an understanding of the mode of operation of the invention; and FIG. 2 is a block diagram of the components involved in the herein-exemplified embodiment of my invention.

By way of general statement as to the mode of operation of the invention, it may be said that the invention embraces the concept of controlling of radar pulses by displacing some of the transmitted pulses from their normal position to avoid coincidence with the returned pulses without changing the average pulse repetition frequency.

FIG. 1a shows a situation that may occur with a conventional radar where returned pulses 42 are about to coincide with transmitted pulses 41. Near coincidence, the track of the target would be lost. To avoid this we can displace the pulses as shown in FIG. 1b. Every other transmitted pulse is displaced from its normal position which prevents coincidence of the transmitted pulses and the returned pulses. The time between a transmitted pulse and its returned pulse remains the same since it is determined only by the distance from the transmitter to the target and the velocity of electromagnetic waves.

For the radar to track satisfactorily, it is necessary that track gates 45 and the reception of returned pulses 42 and 44 coincide. This can be accomplished by having track gate 45 on time, if the returned pulse originated from an "on time" transmitted pulse; but if the returned pulse originated from a delayed transmitted pulse, the track gate would have to be delayed an amount equal to the delay of the transmitted pulse.

As can be seen in FIG. 1b, an additional distance can be tracked which is roughly equal to the distance that the displaced transmitted pulses 43 are shifted. As the distance is increased, returns 42 from undelayed transmitted pulses 41 begin to run into displaced transmitted pulses 43. The normal mode of operation can again be used and returned pulses 42 will not coincide with transmitted pulse 41. It is then possible to track in the usual manner until the range is such that the time from a transmitted pulse 41 to its return 42 approaches two times a pulse repetition period as shown in FIG. 1. At this time, it will be necessary to resort to pulse displacement again. To avoid coincidence this time, the pulses must be displaced in groups of two. That is, two transmitted pulses 41 should be on time and two transmitted pulses 43 should be displaced as show in FIG. 1d. The track gates 45 must be similarly displaced.

After the range has increased to where there would be no coincidence of successive undelayed transmitted pulses 41 with returned pulses 42, the radar can again return to normal operation.

This procedure can be repeated at successively greater ranges. The pulses should be displaced in groups corresponding to which transmitted pulse is being tracked through. That is, on the first time through there would be groups of one, second time through, groups of two, etc.

Tracking radars produce gating pulses whose position in time is variable with respect to the pulses transmitted by the radar. These pulses can be produced by purely electronic or by electromechanical means. Depending on the design of the radar, it may be possible to vary the gating pulses over only a limited range with respect to the transmitted pulses. When this is the case, the radar ranging system is normally equipped with mechanical or electrical limits to prevent a radar from being operated outside of the design range. These limits are referred to as range stops. This invention can be used on radar systems that have range stops such as the MSQ-1A which is an S-band conical scan tracking radar. Its range tracking system employs a combination of phasing and a sawtooth voltage with variable pick off point to generate range gates. As a result of the use of a sawtooth voltage whose duration is less than a PRF period in the ranging system, targets cannot be tracked continuously through a range corresponding to more than a PRF period. The range machine is equipped with stops to prevent operation outside the design range. Two radars must be used to permit at least one radar to track at all times. No modification of the radars is necessary. Both radars must be supplied with the same frequency from a master range unit and both supplied with pulses, on time or delayed, derived from the master range unit, which means the pulses are derived from the above-mentioned frequency. The pulses are alternately delayed or on time, which can be controlled by a single unit external to both radars.

Referring to FIG. 2, master range unit 51 generates frequency of 82 kc. which is fed into radar 52 and radar 53. Master range unit also generates a pulse frequency of 820 p.p.s. which is converted to 410 p.p.s. by divider 54. The 410 p.p.s. is either fed directly to radar 52 if gate 56 is open and gate 57 is closed or if gate 56 is closed and gate 57 is open, radar 52 will receive a delayed 410 p.p.s. due to the delay caused by delay multivibrator 55. Similarly, radar 53 will receive an undelayed 410 p.p.s. if gate 59 is open and gate 60 is closed or a delayed 410 p.p.s. if gate 59 is closed and gate 60 is open introducing the delay caused by delay multivibrator 58. Gates 56, 57, 59, and 60 are controlled by gate control unit 61 which allows each radar to receive on time pulses or delayed pulses alternately.

It may be possible to effect some simplification in circuitry by using the smaller pulse groups when one is tracking through later transmitted pulses.

What is claimed is:

In a radar system having range stops, an apparatus for extending range by displacing predetermined transmitted pulses without changing the average pulse repetition frequency, said apparatus comprising: a master range unit having a high frequency sinusoidal output and a pulse signal output; a first pair of gates coupled to the pulse output of said master range unit, one of said pair of gates having a delayed input; a second pair of gates coupled to the pulse signal output of said master range unit, one of said pair of gates having a delayed input; a first radar coupled to the high frequency output of said master range unit and to the output of said first pair of gates; and a second radar coupled to the high frequency output of said master range unit and to the output of said second pair of gates.

References Cited by the Examiner

UNITED STATES PATENTS 3,134,101    5/1964    Dickey _____ 343—7.7

CHESTER L. JUSTUS, *Primary Examiner.*

LEWIS H. MYERS, *Examiner.*

R. D. BENNETT, *Assistant Examiner.*